United States Patent [19]
Schultz

[11] Patent Number: 6,089,973
[45] Date of Patent: Jul. 18, 2000

[54] GREENHOUSE VENTING SYSTEM

[75] Inventor: Hans Schultz, Arlington Heights, Ill.

[73] Assignee: SPS Corporation, San Jose, Calif.

[21] Appl. No.: 09/121,472

[22] Filed: Jul. 23, 1998

[51] Int. Cl.[7] .................................................. F24F 7/02
[52] U.S. Cl. ........................................ 454/250; 454/364
[58] Field of Search .................................. 454/250, 358, 454/364; 52/199

[56] References Cited

U.S. PATENT DOCUMENTS

| | | | |
|---|---|---|---|
| 4,557,183 | 12/1985 | Kolt | 251/91 |
| 4,597,324 | 7/1986 | Spilde | 236/49 |
| 4,672,889 | 6/1987 | Lynch | 454/364 |
| 4,955,287 | 9/1990 | Dupont | 454/364 |
| 5,839,233 | 11/1998 | Smit | 52/198 |

*Primary Examiner*—Harold Joyce
*Assistant Examiner*—Derek S. Boles

*Attorney, Agent, or Firm*—Fitch, Even, Tabin & Flannery

[57] ABSTRACT

In accordance with the present invention, there is provided a new and inexpensive ventilating system for greenhouses using rigid plastic, glazing panels that are thin, lightweight, and quite long. This is achieved by bending outer ends of the glazing panels and lifting to create vent openings. This method takes advantage of the inherent flexibility of these glazing panels to bend them to shift between open and closed positions without the use of a conventional, separate hinged, framework section. Particularly, in accordance with the present invention, an actuator is connected to a flexible bendable portion of the elongated, rigid glazing panel and the actuator lifts and bends an end portion of the panel, which has an inherent flexibility unlike glass or thin films and which has a memory and an elasticity, such that the panel wants to return to its normal unflexed position, which is the closed position, in the preferred embodiment of the invention.

17 Claims, 7 Drawing Sheets

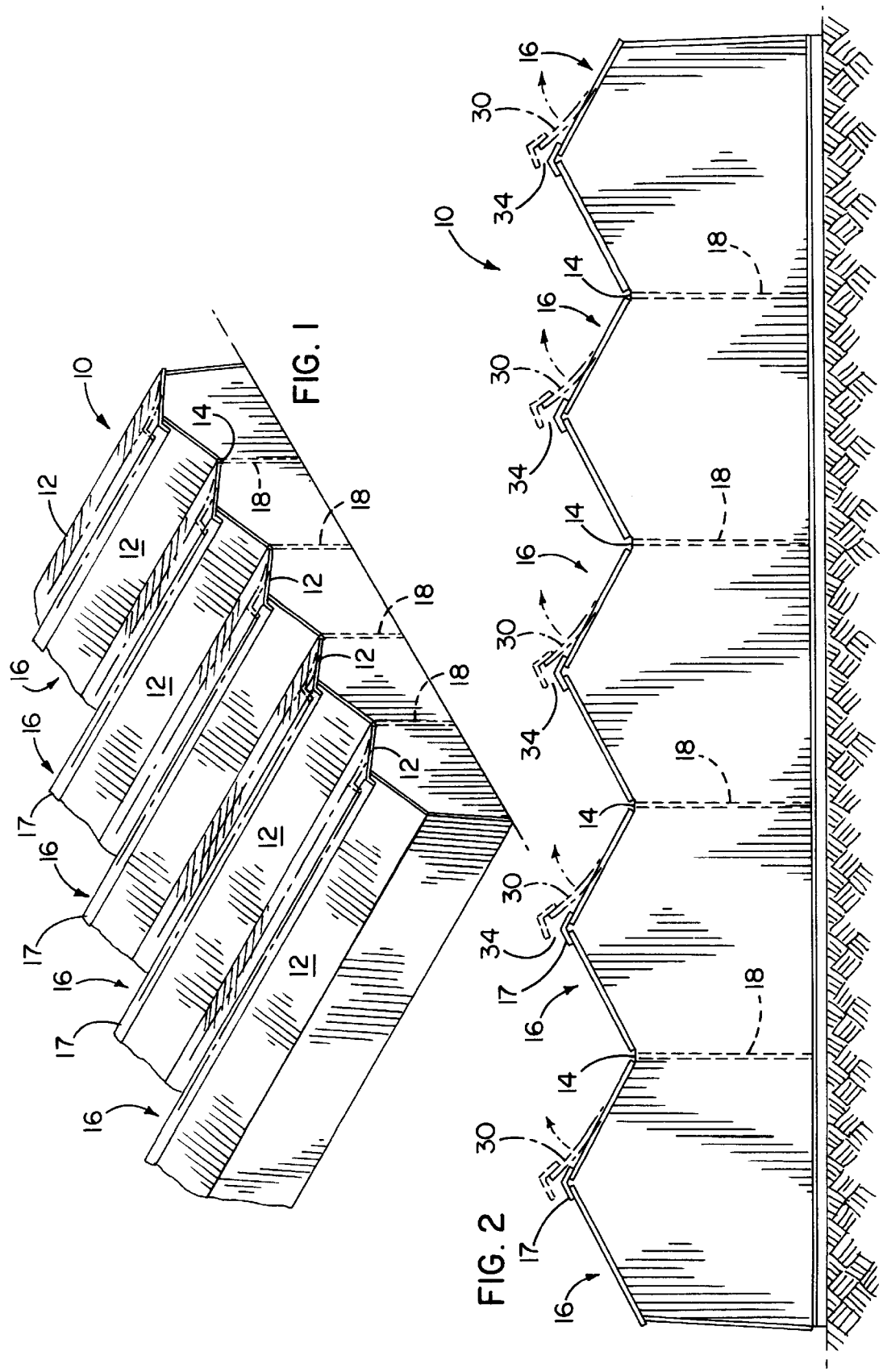

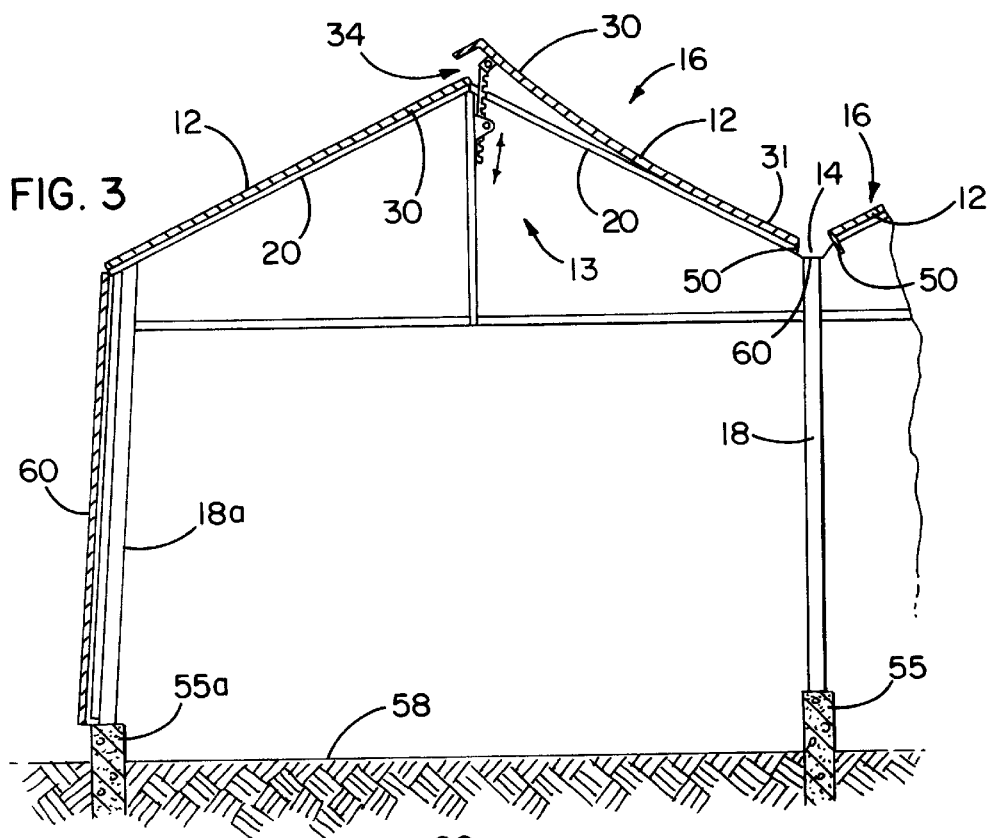
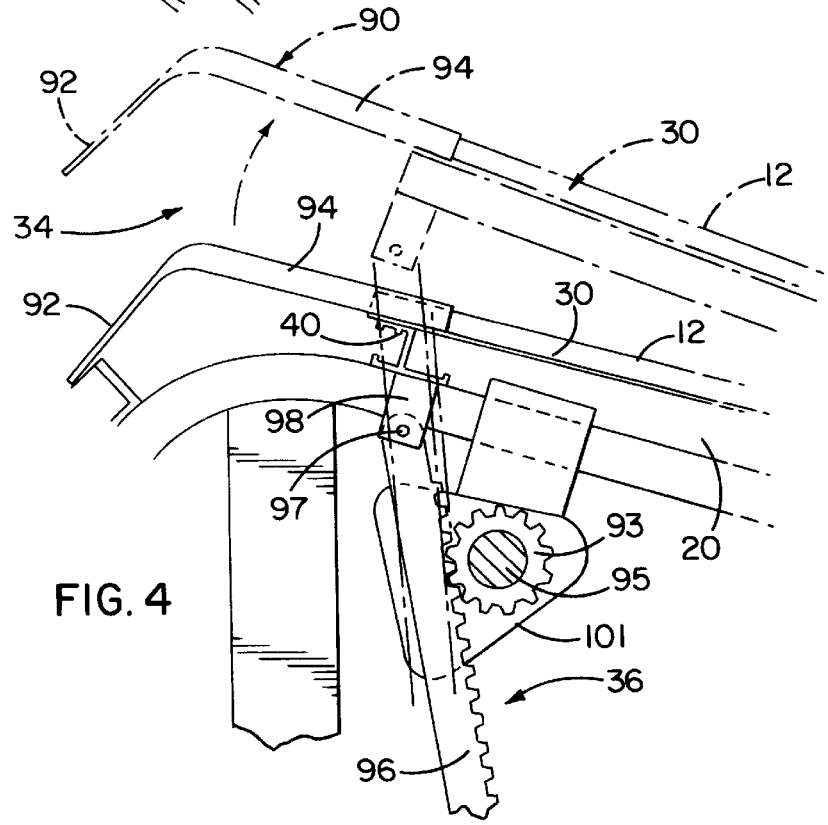

GREENHOUSE VENTING SYSTEM

FIELD OF THE INVENTION

This invention relates to greenhouses, and more particularly to a greenhouse having a ventilating system.

BACKGROUND OF THE INVENTION

This invention is directed to providing a venting system in a greenhouse which uses elongated, rigid panels of polycarbonate or the like. These glazing panels can be translucent or transparent and thicker than a plastic film and are usually corrugated to provide more rigidity thereto. An example of such a rigid, plastic glazing panel is sold under the trademark DYNAGLAS® by Specialty Products Corporation, San Jose, Calif. These glazing panels are very light in weight compared to glass glazing panels and they have a life of 25 years or more, as contrasted to plastic films which may have a life of only 3 years or so. These plastic glazing panels are not brittle or frangible like glass, which easily can be shattered. Typically, these rigid panels come in standard widths, for example, 48" wide and in lengths up to 39 feet in length. Glass panels of comparable size would be too heavy to be installed in greenhouses. Glass glazing panels require more supporting structure because of their heavier weight than these plastic glazing panels.

There are a number of greenhouse types throughout the world. In various parts of the world greenhouses are made in a very inexpensive manner, using the very thin plastic film over supporting curved rafters. Plastic film loses light transmission both because it is of polyethylene, which is poor in terms of resisting UV radiation, and also because most films have no condensation treatment. The treatment applied to films which are treated usually lasts only a year or two. Condensation droplets reflect the solar energy back out into the atmosphere. U.S. Pat. No. 5,715,634, which is assigned to the assignee of this invention, discloses a system for replacing such thin sheet plastics with the elongated, rigid glazing panels of polycarbonate or the like described above, and providing a condensate removal channel. This patent discloses in FIG. 5A a conventional ventilating system which generally comprises a ventilating section having a frame work with individual glazing panels and the venting section which is pivotally mounted at a hinged end. Often a common motor drive with a long common drive shaft is used to pivot upwardly the venting section with its glazing panels. Usually, there is a second venting section adjacent the lower edge of the roof which is similarly formed with a hinged section having individual glazing panels within the framework of the hinged venting section. An actuator, usually motor driven, is used to pivot the side and lower roof ventilating sections to an open position so that air may flow across the underside of the roof of the greenhouse. The cost of providing separate frameworks with hinges and separate glazing panels in the ventilating sections which pivot open like a pivoted window, as well as the common actuating for the ventilating sections, is cost prohibitive in many instances. Thus, there is a need for providing greenhouses using the elongated, rigid glazing panels of polycarbonate or the like with an inexpensive ventilating system such that the user will purchase or install a ventilating system when retrofitting an existing plastic film greenhouse or when erecting a new greenhouse having rigid, plastic glazing panels for the roof.

Another low cost form of greenhouses built to cover very large areas involves glass greenhouse sections having a width of about 3 or 4 meters with greenhouse sections joined together and which have peaked glass glazing panels in each peaked section. Glass breakage and re-installing new glass panels is a big problem. It is desired to retrofit these existing greenhouses having these glass panels with the rigid corrugated panels of polycarbonate or the like, at the same time, to provide an inexpensive venting system for such greenhouses which currently lack any such venting system. For a number of reasons, as set forth in U.S. Pat. No. 5,715,634, owners of these greenhouses will replace the glass panels with the corrugated, rigid glazing panels and also want to add an inexpensive venting system, if available.

Manifestly, the two kinds of greenhouses described herein are merely representative of these different kinds of glass and plastic film roof greenhouses, and the present invention can be used with any kind of greenhouse.

SUMMARY OF THE INVENTION

In accordance with the present invention, there is provided a new and inexpensive ventilating system for greenhouses using rigid plastic, glazing panels that are thin, lightweight, and quite long. This is achieved by bending outer ends of the glazing panels and lifting to create vent openings. This method takes advantage of the inherent flexibility of these glazing panels to bend them to shift between open and closed positions without the use of a conventional, separate hinged, framework section. Particularly, in accordance with the present invention, an actuator is connected to a flexible bendable portion of the elongated, rigid glazing panel and the actuator lifts and bends an end portion of the panel, which has an inherent flexibility unlike glass or thin films and which has a memory and an elasticity, such that the panel wants to return to its normal unflexed position, which is the closed position, in the preferred embodiment of the invention.

In accordance with the invention, the rigid plastic glazing panels can be easily bent to provide venting openings 3 or 4 feet in height and extending in width for the panel width, e.g., 4 feet. This provides a large venting area.

In accordance with another important aspect of the invention, the panels may be connected by very simple actuators which are manually lifted and then propped or otherwise secured to hold the panels in an open position without the use of expensive motors or common drives.

The preferred corrugated panels do not require that a rafter be positioned along their downwardly sloped edges as do panes of glass in conventional greenhouses. The glass panels used in the prior art greenhouses require supporting rafters along both side edges of the rafters. With the corrugated glazing panels, the sloped edges may meet between a pair of rafters and the edges of the panels which are overlapped in one corrugation. Usually, the hinged glassed vent sections of these glass greenhouses have very long and heavy vent sashes that extend from one end of the greenhouse to the other. In contrast thereto, the present invention allows a corrugated venting sash of only 2 to 4 corrugated panels and these are pushed or pulled open with single push or pull bars. Each 2 to 4 panel section overlaps the next section. When the sections overlap, they have to be opened (and closed) in proper sequence to keep their previous overlapping. While this overlapping requires sequential operation, it still allows the elimination of the vent sash side framing members used in the conventional vent sashes.

BRIEF DESCRIPTION OF THE DRAWINGS

FIG. 1 is an illustration of a greenhouse having a ventilating system installed in accordance with the preferred embodiment of the invention;

FIG. 2 is an end elevational view, slightly enlarged, of the greenhouse shown in FIG. 1 with bendable upper glazing panel portions;

FIG. 3 is an enlarged, partially cross section view of the greenhouse embodiment of FIG. 1;

FIG. 4 is an illustration of an upper venting system and an actuator constructed for use with the FIGS. 9 and 10 embodiment of the invention;

DETAILED DESCRIPTION OF THE PREFERRED EMBODIMENTS

Figure 10:
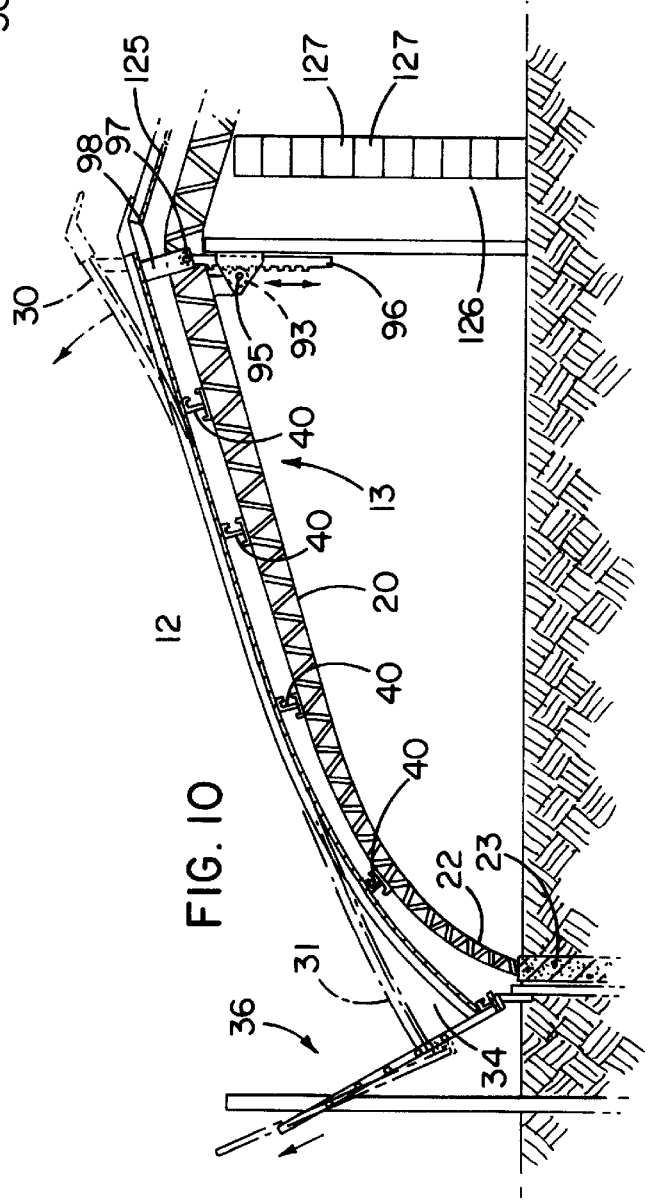
FIG. 10 is a cross-sectional view of the greenhouse of FIG. 9 and showing roof truss which was formerly used to support a thin film sheet of plastic glazing.
Figure 11:
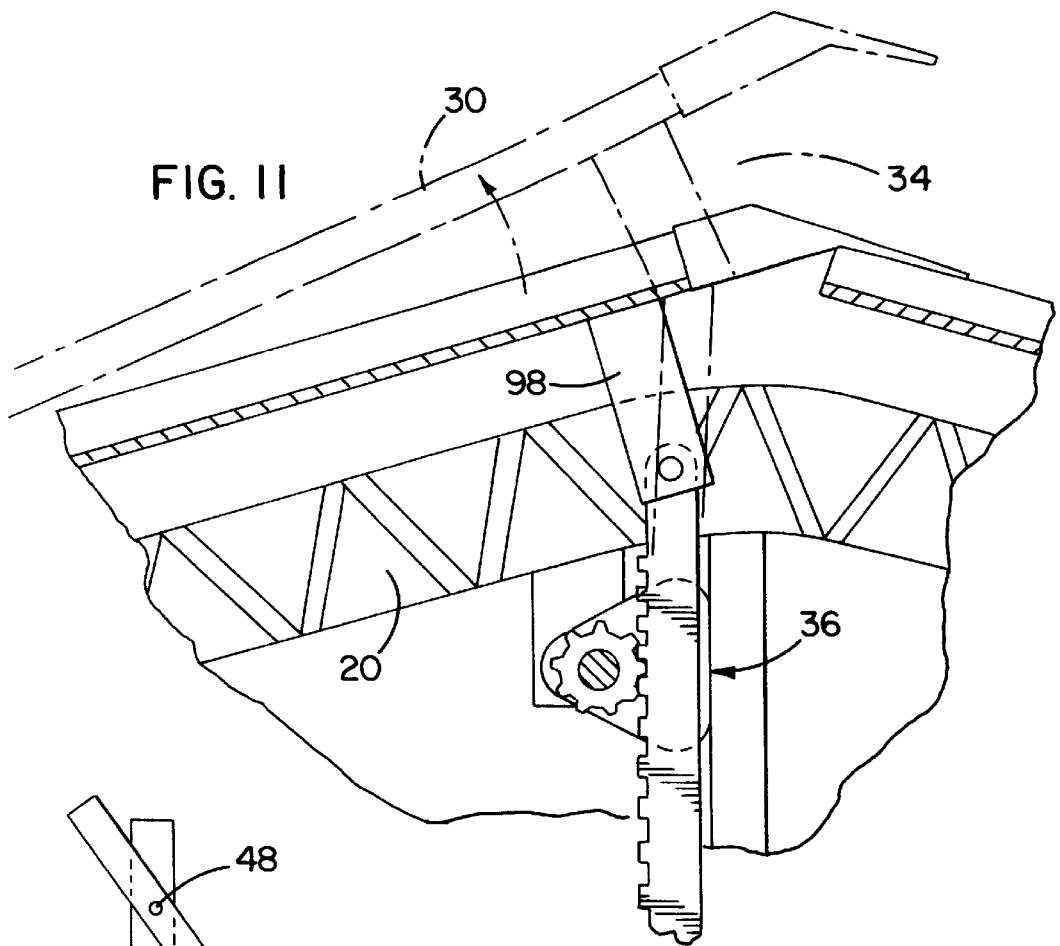
FIG. 11 illustrates a common actuator drive for flexing the upper portion of a glazing panel of the FIGS. 9 and 10 greenhouse to an open position.

As shown in the drawings, the invention is embodied in a greenhouse 10 having roof glazing panels 12 supported on a framework 13 (FIGS. 3 and 10). The type of greenhouse shown in FIGS. 1 and 2 is typical of a greenhouse made formerly with glass roofing panels (not shown) which have been replaced with plastic, rigid glazing panels 12; and the type of greenhouse shown in FIG. 10 is typical of a greenhouse which formerly had a thin, plastic film for the roof which has been replaced with the plastic, rigid glazing panels 12. Manifestly, other shapes and forms of greenhouses can be built with the plastic, rigid glazing panels and the inventive, ventilating system of the present invention. The glass roof panel greenhouses of FIGS. 1 and 2 are typical of greenhouses built by companies from Holland which install a large number of side-by-side, peak greenhouse sections 16, each of which has a roof peak 17 and which have a common gutter 14 between each of the sections 16. Only five peaked sections 16 are illustrated while the greenhouses often have ten to fifteen sections 16. The peaked units generally extend in width about 10-½ ft. between vertical support posts 18, as shown in FIG. 2. The glass panel glazing systems lacked any venting system whatsoever, and particularly there were no venting systems for the roofs of the glass panel construction shown in FIGS. 1 and 2. Typically, such structures were not provided with venting systems because of their low cost construction and conventional venting paneled systems added too much cost for buyers in many countries, such as Romania. A large number of greenhouses, such as shown in FIGS. 1 and 2, are currently in existence.

Figure 9:
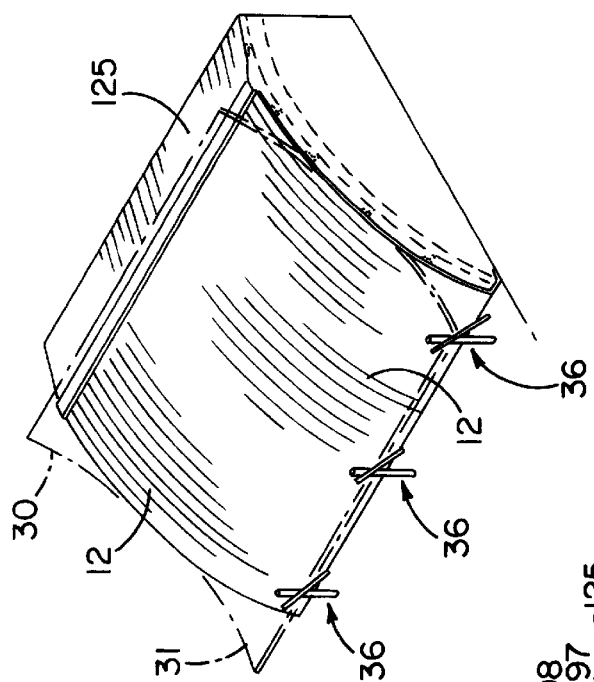
FIG. 9 illustrates a leanto type greenhouse formerly using a thin film sheet which has been replaced with corrugated glazing panels having upper and lower ends bendable to create vent openings.

In another form of the invention, shown in FIGS. 9 and 10, the greenhouses 10 are so-called "leanto" greenhouses which are common in China. These leanto greenhouses are constructed with arched frame members or rafters 20, which were used to support thin film of plastic sheets (not shown) rather than more rigid glazing panels 12, such as polycarbonate or glass. Typically, the thin films of plastic were laid over a series of the arched truss members 20 which had lower ends 22 embedded in concrete foundations 23, as shown in FIG. 10, with the upper ends of the truss work members meeting at a center supporting post 25. The thin plastic films were laid completely over the series of these arched truss members which were made of metal and which provided the supporting framework 13 for the thin plastic ply films used for the glazing.

In accordance with the present invention, the glass glazing panels formerly used in the greenhouses of FIG. 1 and the thin plastic film used in the greenhouses of FIGS. 9 and 10 have been replaced by glazing panels 12 formed of elongated rigid panels of polycarbonate, and the greenhouse is provided with an inexpensive venting system. The rigid, plastic glazing panels 12 of polycarbonate are provided with a very unique and inexpensive venting system in that the inherent flexibility and elasticity of the panels themselves is used to allow the bending of an upper or lower end portion 30 or 31, or both, of the panels 12 from a lower closed position 34, which is shown in solid lines in FIGS. 2 and 10, to an upper dotted line position, which is the open position, as shown in FIGS. 2 and 10. When the end portions are in the open position, they are spaced above the roof to provide a venting opening 34. Air flows through the vent openings 34, FIGS. 2 and 10, into the interior of the greenhouse or, alternatively, air will flow outwardly through the vented openings 34 of the greenhouse. In the embodiments of the invention, shown in FIGS. 2 and 10, the upper end portion 30 of the glazing panel 12 is raised or lifted to the dotted line position shown in FIGS. 2 and 10 by an actuator or lifting mechanism 36 so that the air may flow through a vent opening 34 into or from the greenhouse to cool the interior of the greenhouse.

As shown in FIG. 10, a lower end portion 31 of the glazing panel 12 may be bent and flexed upwardly to provide a lower vent opening 34 by movement of a lower actuating mechanism 36.

Figure 5:
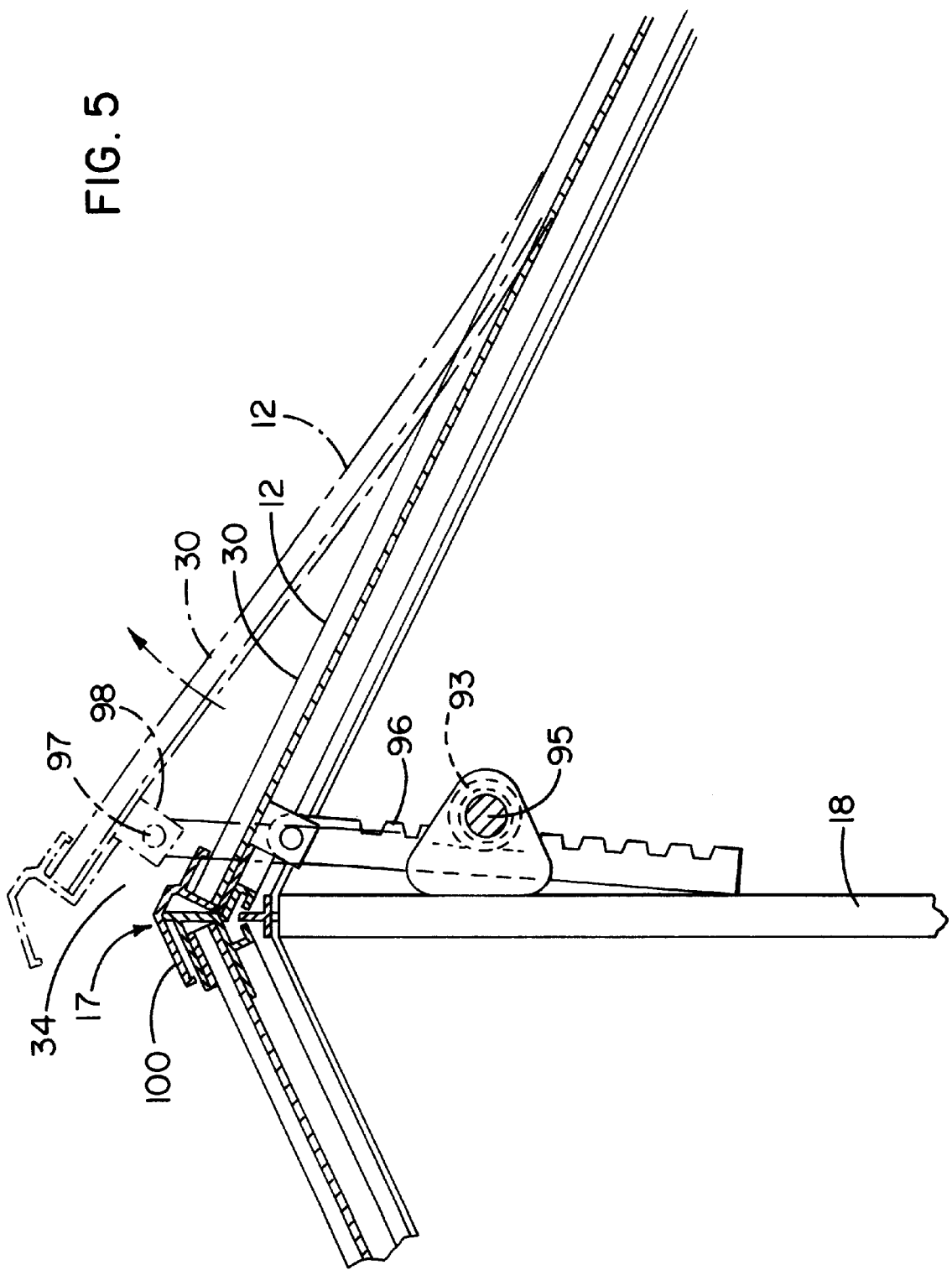
FIG. 5 is a fragmentary, enlarged view of a bendable, corrugated, plastic glazing panel having its upper end bent by an actuator to create a vent opening for the greenhouse of FIGS. 1 and 2.
Figure 6:
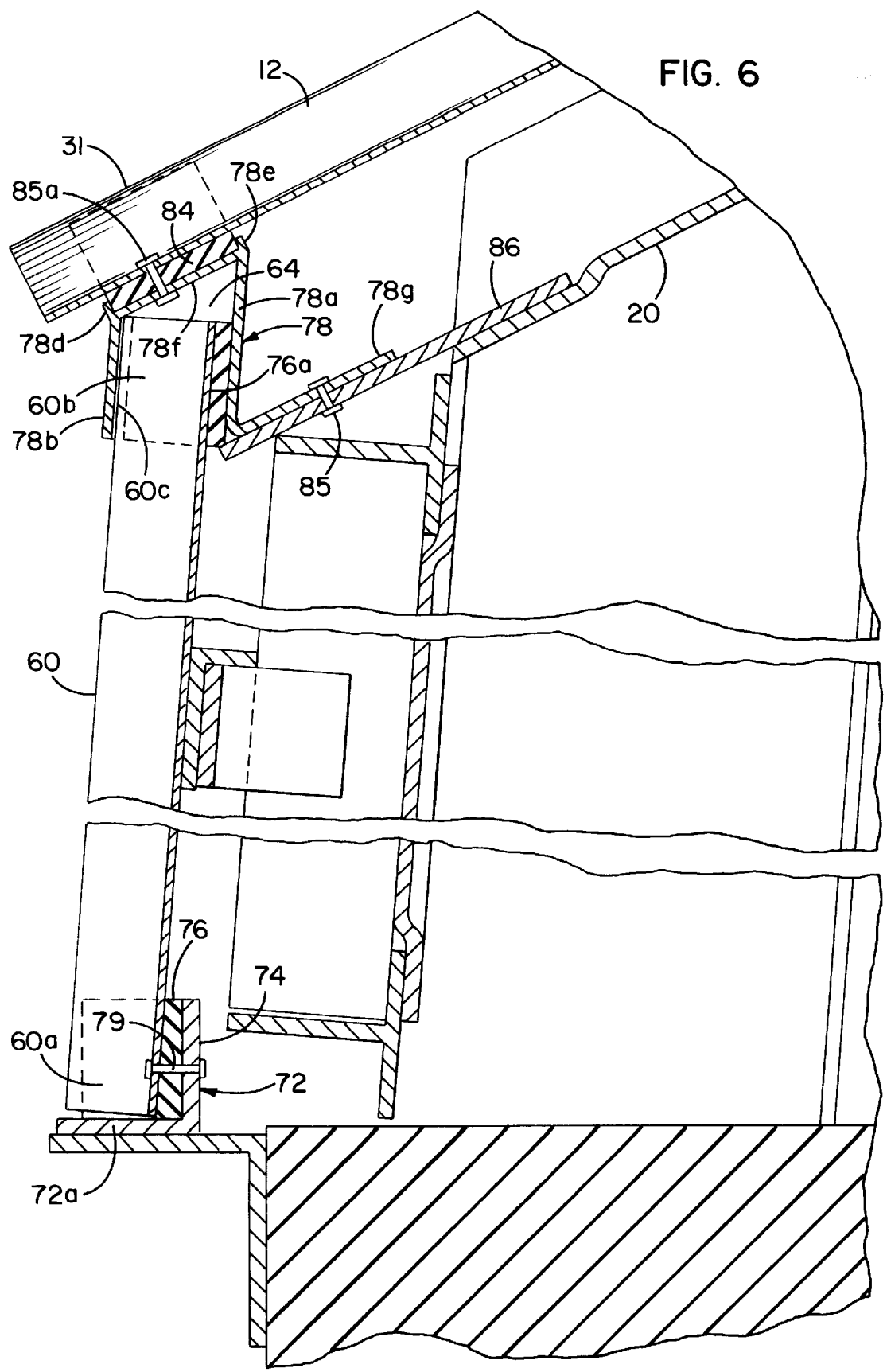
FIG. 6 is a cross-sectional view of a sidewall and lower roof portion formed of corrugated, plastic glazing panels for the greenhouse of FIGS. 1 and 2.

The bending of the flexible glazing panels 12 for the greenhouse of FIGS. 1 and 2 is illustrated in FIG. 5, where the glazing panel 12 is secured by a fastener 39 to an underlying support shown in FIG. 6 or FIG. 8 and described hereinafter. Typically, the support and lower fixed end of the glazing panel will be about 4 or 5 feet from the roof peak 17 and this 4 or 5 feet allows a bending of the upper end portion 30 of the glazing panel to lift several feet to form the vent opening 34. Usually, the sheet width is 4 feet along the length of the peak so that a large area is opened for the venting. Each of the glazing panels 12 may have its upper end portion 30 lifted so that the entire length of the roof may be opened to allow air flow. Alternatively, only selected glazing panels could be opened and others left shut or fixed. As another alternative, some glazing panels may be permanently closed or they may not be connected to the actuator 36 to shift open.

Figure 12:
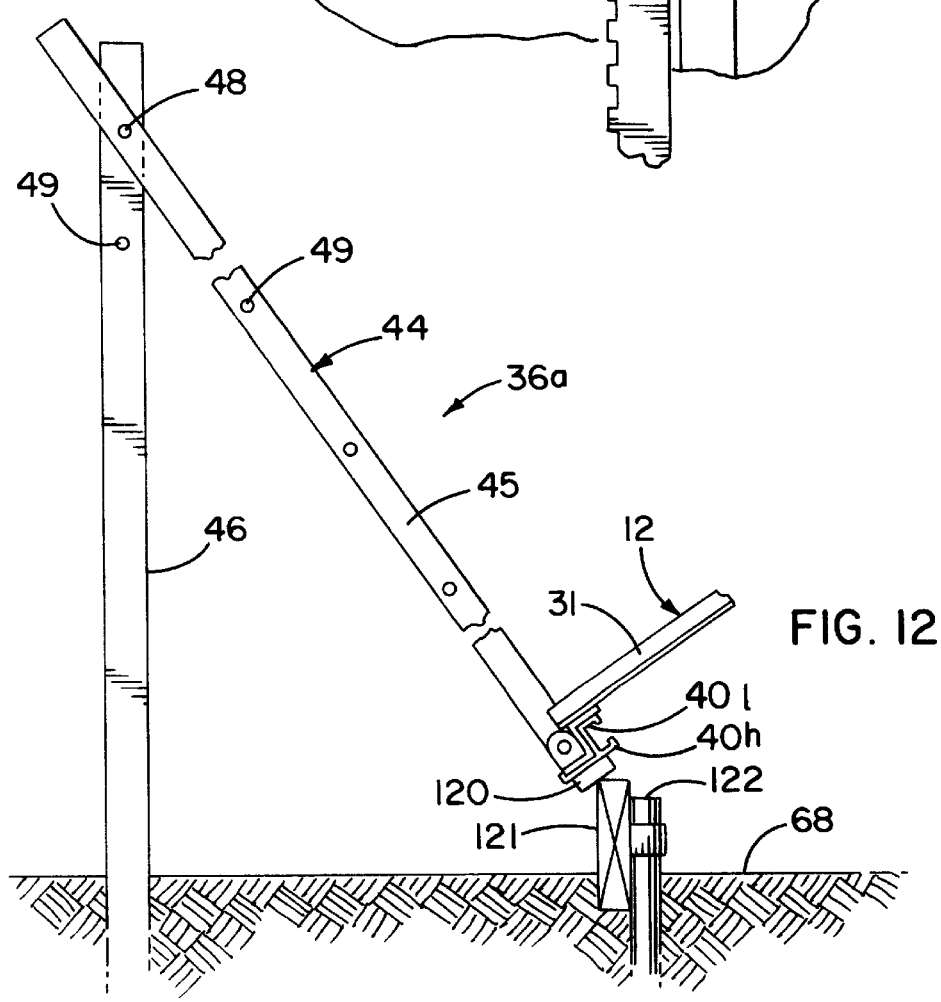
FIG. 12 is a drawing of a manually movable, rigid prop for lifting and holding the lower portion of the flexible shape to the open position for venting.

In the embodiment of the invention shown in FIGS. 1 and 2, the roof panels extend only a short distance from the roof peak 17 to the gutter 14, e.g., about 5 feet. In this instance, there are no purlins such as the purlin 40 described above in connection with FIG. 5 and the lower end portion 31 of these glazing panels are secured at the gutter 14, as will be described hereinafter in connection with FIG. 8.

Where there is a need for a very inexpensive manual lifter for opening the lower vents, the lifting mechanism 36, shown in FIG. 12, is comprised of a simple prop 44 that is manually shifted. The illustrated manual prop comprises a bar 45 and a supporting post 46 with a pin 48 inserted through one or more aligned openings 49 in the bar and post. That is, the user will pull the bar 45 upwardly and then insert the pin 48 through the aligned holes in the bar and post to hold the lower portion 31 in the upper raised position to allow the air to flow under this end portion 31 and through vent opening 34 and into the greenhouse. Upon removal of the pin 48, the natural inherent flexibility of the lower portion 31 of the panel 12 causes the lower panel end 31 to move downward to the closed, sealed position shown in FIG. 12.

Figure 7:
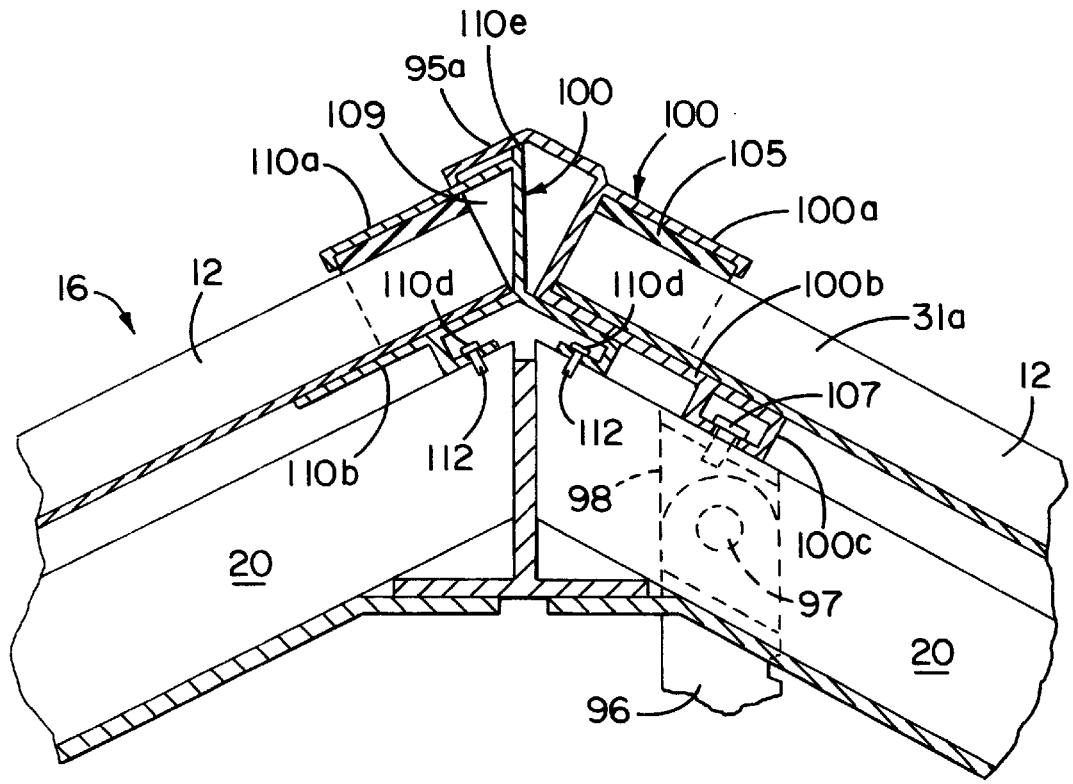
FIG. 7 illustrates a flashing secured to an upper end of a glazing roof panel and a ridge detail for the greenhouse of FIGS. 1 and 2.
Figure 8:
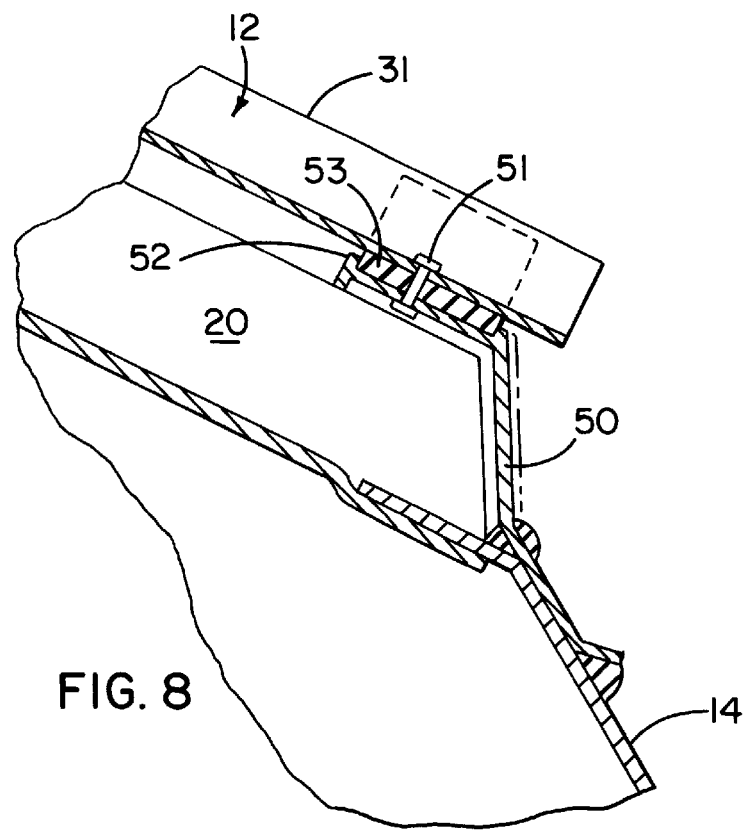
FIG. 8 is a view of a seal located at a central gutter section between adjacent sections of the FIGS. 1 and 2 greenhouse.

In the embodiment of the invention shown in FIGS. 1–3, the glazing panels 12 of the left side of the greenhouse sections 16 are all rigidly attached to the framework 13 and the upper portions 30 of the glazing panels do not open, whereas the upper portions 30 of the roof glazing panels 12 on the right hand section 16 flex upwardly to the open position about the lower end 31 (FIG. 8). The framework 13 includes rafters 20 (FIGS. 7 and 8) that formerly supported the glass panels. The rafters 20 extend downwardly to horizontally extending profiles or extrusions 50 which are on opposite sides of the gutter 14. The gutter is supported at its lower portion 60 by the upstanding post 18 (FIG. 3). The illustrated posts 18 are I-beams which are supported at the lower ends in a concrete post 55 which is embedded in the earth 58. A series of such posts 18 are shown in FIGS. 1 and 2. At the outer sides there are also vertical extending posts 18a which are embedded in concrete posts 55a (FIG. 3) in the earth 58 to support the sidewalls and to support the lower end of the roof.

The lower end portions 31 of the glazing panels are fixed to the gutter extrusion 50 by fasteners 51 (FIG. 8). The extrusion 50 has upper, lipped channel 52 carrying a seal which is corrugated on its upper side to seal the lower end of the roof panels 12.

Referring now in greater detail to the preferred sidewall construction (FIG. 6) for the greenhouse of FIGS. 1 and 2, it is preferred to replace the sidewall, glass panels (not shown) with corrugated sidewall panels 60 which extend vertically and have the lower ends supported by a lower angle 72 which has a vertical leg 74 which abuts a foamed seal element 76 for a lower end 60a of the sidewall panel 60. The lower end 60a of the side glazing panel rests on a lower leg 72a of the angle 72. An upper end 60b of the sidewall panel 60 is positioned within a slot or groove 64 of an extrusion 78 of generally a Z-shaped configuration. The extrusion 78 has parallel, vertical legs 78 and 78b defining the open upper slot 64 to receive the upper end 60b of the sidewall panel. A suitable seal 76a is positioned between the upper end 60b of the sidewall panel and a vertical leg 78a of the extrusion 78. The depending leg 78b of the extrusion 78 abuts an outer, upper edge 60c of the sidewall panel 60. Thus, the upper end of the sidewall panel will be contained within the slot 64 which extends downwardly. The upper panel ends 60b are merely inserted upwardly into the slot 64 and then the lower ends 60a of the panels are shifted to abut the lower seal 76. To complete the installation, suitable fasteners 79 are employed to fasten the lower ends of the panels 60 into the vertical leg 74 of the lower bracket 72.

It is preferred to provide an upper seal element 84 (FIG. 6) for sealing against the upper roof corrugation 52 at its lower end portion 31 for the greenhouse embodiment of FIGS. 1 and 2. The seal element 84 has an upper portion which is corrugated to match and fit into the corrugations of the corrugated, roof glazing panel 12. Preferably, the seal 84 is positioned within a channel formed by a pair of upstanding lips or flanged edges 78d and 78e with a central wide portion 78f between the lips. The lower ends of the glazing panels are secured by fasteners 85a to the extrusion 78. The extrusion 78 has a vertical attaching flange 78g which is secured by a suitable fastener 85 to an existing steel flange portion 86 which is is on the existing glass greenhouse. The existing flange portion 86 is secured to a lower end of the existing steel rafter 20.

It is preferred that the upper bent end portion 31 of the glazing panel 12 carry a flashing or seal member 90 to form a closed, moisture sealing upper roof peak or ridge. For the greenhouse embodiment of FIGS. 9 and 10, a flashing 90 (FIG. 4) has a sloped, bent lip or flange 92 which extends across the peak to the left side of the roof to overlie an upper end portion 30 of the left hand, glazing panels 12. A main body portion 94 of the flashing is secured to an upper purlin 40 which underlies the upwardly bendable portion 30 of the right glazing panel 12 (FIG. 4). Thus, the lip 92 and the main body portion 94 of the flashing 90 cover the peak, as shown in solid lines in FIG. 4.

The common actuator 36 for lifting the right, upper end portions 31 of glazing panels 12 of the FIGS. 9 and 10 embodiment, preferably includes a common shaft 95 (FIG. 4) extending the length of the greenhouse roof and having gears 93 located beneath each glazing panel 12. The gears mesh with vertically extruding, toothed racks 96 which are guided for vertical reciprocation in a housing 10 attached to the framework 13. The upper ends of the racks 96 are connected by a pivot pin 97 to a bracket 98 fixed to the purlin 40. Usually, a chain drive or motor is connected to and rotates the common shaft 95 to turn all of the gears 93 to shift vertically all of the meshed racks 96 to lift or lower all of the upper panel ends 30 between an open venting position and a lower, closed position where the flashing 90 covers the roof peak.

Turning now to the FIGS. 1 and 2 greenhouse, the upper side or peak is shown in FIG. 7; and an extrusion 100 may be formed with an upper integral flashing 95a to extend over the peaks. A pair of downwardly sloped parallel flanges 100a and 100b may receive the upper ends 31a of the glazing panels 12 with a seal 105 between the overhead flange 100a and the glazing panel's end. The leg 100b has a slotted channel 100c to receive a head of a threaded fastener which secures the bracket 98 to the extrusion 100. The pivot pin 97 connects the rack 96 to bracket 98. Thus, lifting of the rack 96 by the gear 93 (FIG. 4) pushes the bracket 98 and the extrusion upwardly to open the vent opening 34.

The left hand side of the greenhouse section 16 has the fixed upper ends of the glazing panels 12 inserted into a slot 109 formed between legs 110a and 110b of an extrusion 110. The extrusion has lower integral feet 100d secured by fasteners 112 to the rafters 20. An upstanding pointed edge 110e of the extrusion 100 supports the underside of the flashing 95a when the right side of the roof is in the closed position, as seen in FIG. 7.

Referring now to the former thin film leanto kind of greenhouse shown in FIGS. 9 and 10, it is preferred to open both the lower bendable end portion 31 of the glazing panels and the upper end portion 30 of the glazing panels. A generally flat roof area or section 125 (FIGS. 9 and 10) is provided and it is supported by a vertical block wall 126 of concrete blocks 127. The flat roof 125 is about 3 or 4 feet wide. These greenhouses have the arched truss kind of rafters 20. A plurality of purlins 40 extend horizontally and are secured to and rest on top of the rafters. The purlins are typically spaced 4 or 5 feet apart. The same kind of lifting mechanism 36 may be used for the upper end portions 30 of the glazing panels 12 and this lifting mechanism includes the vertical rack 96 (FIGS. 4 and 10) driven by the meshed gear 93 fixed to the rotatable shaft 95. A pivot pin 97 pivotally connects the upper end of the rack to a lower end of a bracket 98 fixed to the upper bendable end 30 of the roof glazing elements 12. Preferably, a rack is provided for each four foot wide panel 12 so that all panels have their upper portions moved simultaneously and through equal distances as they travel between the fully closed and fully open positions.

The prop lifting mechanism 36a shown in FIG. 12 is connected to a lower purlin 40l and it has a depending flange 40h carrying a lower, stationary seal block 120 to engage a stationary seal block 121 which is fastened to vertical supports 122 secured in the earth 68.

From the foregoing, it will be seen that rigid, plastic glazing panels are bent or flexed to their open position to create the vent opening without hinges or separate panels. It would be possible to reverse these directions and to force the glazing panels downwardly to a closed position from an upper raised position. While corrugated, glazing panels are disclosed, it is possible to use non-corrugated glazing panels. Also, while DYNAGLAS® glazing panels are preferred, other brands of corrugated, plastic rigid glazing panels could be used. The DYNAGLAS® panels vary in widths up to about 4 feet, 6 inches in width and 39 feet in length. The thickness is about 0.31 inch and the weight is about 0.25 lbs. per square foot. This is merely by way of example, because other sizes and weights and materials may be used for the plastic, rigid glazing panels 12 than that described herein, by way of example only.

It will be appreciated that although various aspects of the invention have been described with respect to specific embodiments, alternatives and modifications will be apparent from the present disclosure, which are within the spirit and scope of the present invention as set forth in the following claims.

What is claimed is:

1. A greenhouse having a roof and a roof ventilating system comprising:

a frame;
   roof frame members in the frame extending from a side of the greenhouse to a peak for the greenhouse;
   purlins on the frame extending laterally between the roof frame members;
   rigid roof panels of plastic supported by the frame and forming a roof covering for the greenhouse;
   an end portion of the rigid plastic panels being bendable from a lower closed position to a raised open venting position; and
   an actuator for shifting the bendable end portions of the panels and allowing air to flow to or from the vent opening.

2. A greenhouse in accordance with claim 1 wherein the bendable portion is an upper peak portion of the rigid panels.

3. A greenhouse in accordance with claim 1 wherein the bendable portion is a lower end wall portion of the rigid panels.

4. A greenhouse in accordance with claim 1 wherein a second and opposite end portion of the rigid panels is bendable between a closed and an open position; and
   the actuator includes a manual prop which is connected to the bendable end portion to lift and prop open the bent end portion.

5. A greenhouse in accordance with claim 1 wherein the rigid, plastic panels are corrugated panels with the corrugations extending parallel to a slope for the roof.

6. A greenhouse in accordance with claim 1 wherein a plurality of peaked sections are provided on the greenhouse; roof panels on one side of the peak being non-bendable, and the roof panels on the other side of the peak having the bendable end portions to vent each peak section along one side of its peak.

7. A greenhouse in accordance with claim 1 wherein the rigid roof panels extend from a lower sidewall portion adjacent the ground to an upper roof portion at the peak; and
   the bendable portions are located at both the lower sidewall portion and the upper roof portion to allow air to flow through a lower vent opening adjacent the ground upwardly under the roof panels to exit a vent opening adjacent the peak of the roof.

8. A greenhouse in accordance with claim 1 wherein the bendable portion is flexed upwardly at least 2 feet at an inlet of the vent opening.

9. A greenhouse in accordance with claim 8 wherein the bendable portion begins bending at least 3 feet from an end edge of the rigid, plastic panel.

10. A greenhouse in accordance with claim 1 wherein a seal member is abutted by the bendable end portion of the glazing panel when it is in its closed position.

11. A greenhouse in accordance with claim 1 wherein a flashing member is provided on a bendable upper end portion of the glazing panels to cover the roof peak when the upper end portion is in its closed position.

12. A greenhouse in accordance with claim 1 wherein condensate collectors are provided on the purlins; and
    drains extend downward and are positioned beneath the condensate collectors to convey the condensate downwardly for discharge.

13. A greenhouse in accordance with claim 1 wherein
    side glazing panels are formed of corrugated, rigid plastic sheets having upper ends located adjacent bendable, lower end portions of the roof, rigid plastic glazing panels.

14. A method of providing ventilation in a greenhouse comprising:

providing a roof with bendable, plastic glazing panels;
    exerting an upward force on an end portion of the bendable, plastic glazing panels;
    bending the glazing panel about an inward secured portion of the glazing panel to an open position where the end portion is spaced from the greenhouse to define a vent opening for air flow;
    flowing air through or from the vent opening into or from the interior of the greenhouse;
    shifting the bendable end portion of the glazing panel to a closed position to substantially close the vent opening to air flow therethrough; and ; and
    manually lifting lower end portions of the glazing panels to form the vent openings.

15. A method in accordance with claim 14 including:
    manually lifting and propping the bent, lower end portions in the open position.

16. A method in accordance with claim 14 including
    operating a common lifting mechanism connected to upper ends of the glazing panels adjacent the peak of the roof to bend the same upwardly to the open position for venting air.

17. A method in accordance with claim 14 including
    providing fixed glazing panels on one side of a roof peak;
    providing bendable portions on the other side of the roof peak; and
    bending upper bendable portions on the other side of the roof adjacent the peak to the open position for venting air to and from the greenhouse.

* * * * *

UNITED STATES PATENT AND TRADEMARK OFFICE
CERTIFICATE OF CORRECTION

PATENT NO. : 6,089,973
DATED : July 18, 2000
INVENTOR(S) : Carl Schultz

It is certified that error appears in the above-identified patent and that said Letters Patent is hereby corrected as shown below:

Column 8, line 47, delete the second occurrence of "; and"

Signed and Sealed this

Seventeenth Day of April, 2001

*Attest:*

NICHOLAS P. GODICI

*Attesting Officer*  Acting Director of the United States Patent and Trademark Office